United States Patent

[11] 3,634,777

[72] Inventors Teiji Uchida  
Yoshikawa;  
Washio Shogo, Kunihiko; Ryuji Tatusmi, Tokyo, all of Japan
[21] Appl. No. 60,251
[22] Filed Aug. 3, 1970
[45] Patented Jan. 11, 1972
[73] Assignee Nippon Electric Co., Ltd.  
Tokyo, Japan
[32] Priorities Aug. 4, 1969
[33] Japan
[31] 44/61881;  
Aug. 4, 1969, Japan, No. 44/61882; Aug. 4, 1969, Japan, No. 44/61883

[54] OPTICAL PUMPING DEVICE FOR SOLID-STATE LASER  
13 Claims, 7 Drawing Figs.

[52] U.S. Cl................................................... 331/94.5
[51] Int. Cl................................................... H01s 3/09
[50] Field of Search............................................ 331/94.5

[56] References Cited  
UNITED STATES PATENTS

| | | | |
|---|---|---|---|
| 3,454,897 | 7/1969 | Strauss......................... | 331/94.5 |
| 3,504,298 | 3/1970 | Baugh et al.................. | 331/94.5 |
| 3,521,178 | 7/1970 | Herbrich...................... | 331/94.5 X |
| 3,534,291 | 10/1970 | Martin et al.................. | 331/94.5 |
| 3,560,872 | 2/1971 | Heimann....................... | 331/94.5 |

Primary Examiner—Ronald L. Wibert  
Assistant Examiner—Edward S. Bauer  
Attorney—Sandoe, Hopgood & Calimafde ABSTRACT: An improved-efficiency optical pump for a solid-state laser comprises a light source surrounded by a reflecting surface having at least one light outlet window formed therein. Means having a first focal point at the outlet window and a second focal point at the laser material are provided to focus the light emitted through the outlet window onto the laser material. Several embodiments of the invention are disclosed.

PATENTED JAN 11 1972  3,634,777

INVENTORS
TEIJI UCHIDA
SHOGO YOSHIKAWA
KUNIHIKO WASHIO
RYUJI TATSUMI by
Sandoe, Hopgood & Calimafde
ATTORNEYS

OPTICAL PUMPING DEVICE FOR SOLID-STATE LASER

The present invention relates generally to laser optical pumping devices, and more particularly, to an improved structure and arrangement of an optical pumping device for a laser, and a pumping source which provides increased radiation coupling efficiency.

As is already known in the field of laser technology, by supplying a solid-state laser material with a sufficiently intense optical energy from an external source, it is possible to make the laser material emit laser light rays. Many proposals have previously been offered with regard to the geometric structure and the arrangement of an optical pumping device for a laser to efficiently couple the optical radiation from the pumping source onto the solid-state laser material.

For instance, in an article by R. S. Congleton et al. entitled "Comparison of Excitation Geometry for Ruby Lasers" on pp. 1,415 to 1,425 of "Quantum Electronics III—Proceedings of the Third International Congress," Columbia Univ. Press 1964, there is a discussion of the geometries of optical pumping devices for use with a laser. That article gives a comparative discussion of the pumping efficiencies with respect to an elliptical cylindrical type, a closed-coupling type, a coaxial type, and the like. Among these, an optical pumping device for a solid-state laser containing an elliptical cylindrical reflector has been generally used in the prior art because its pumping efficiency is relatively excellent. In the case of focusing an image of a light source onto a solid-state laser material by means of an elliptical cylindrical reflector, the size of the image of the light source is substantially equal to that of the light source per se and thus corresponds to the latter with a ratio of 1:1. Therefore, if the size of the solid-state laser material is the same as that of the light source, high-efficiency coupling radiation can be achieved.

On the other hand, in order to realize a high-efficiency solid-state laser upon continuous excitation, it is necessary to suppress the temperature rise of the solid-state laser material and to sufficiently cool that material. While there are many possible methods for cooling the laser material, it can be realized, for instance, by means of circulating a water coolant about the material. In this case, in order to enhance the cooling effect, it is only necessary to reduce the diameter of the laser material. However, as described previously, it is preferable that the diameter of the light source be made as small as that of the laser rod in order to prevent a decrease of the coupling efficiency.

However, as another essential factor for realizing a highly efficient solid-state laser, a high-brightness light source is required. In the case of the prior art optical pumping devices for a solid-state laser, since there was a correlation that as the diameter of the luminous section was reduced the brightness thereof was also necessarily lowered, it has not been contemplated to reduce the diameter of the luminous section of the light source without lowering its brightness.

Therefore, in the event that a thin solid-state laser material is used to enhance the cooling effect and a prior art light source is employed, there is a large difference between the diameter of the image of the light source and the diameter of the solid-state laser material.

Since the coupling efficiency of radiation is believed to be approximately proportional to the ratio of the cross-sectional area of the solid-state laser material to the cross-sectional area of the image of the light source, the radiation-coupling efficiency is significantly reduced if the diameter of the image of the light source and the diameter of the solid-state laser material are different from each other. This presents a serious hindrance to the realization of a highly efficient solid-state laser.

In addition, even if a solid-state laser material having good thermal conductivity is used and the cooling effect is thus enhanced, in the event that the laser material is operated as a three-level laser as in a ruby laser, an optical pumping source having an extremely high output and high brightness is required, and for the purpose of continuously operating such type of laser, the light sources in the prior art were insufficient in brightness.

Accordingly, it is an object of the present invention to provide an optical pumping device for a solid-state laser which has an enhanced radiation-coupling efficiency.

In one aspect of this invention an optical pumping device for a solid-state laser comprises an elongated light source and a diffusing reflector means having high reflectivity which surrounds the circumference of the light source and has at least one light outlet window. The outlet window has a width corresponding to that of the excited elongated solid-state laser material and is arranged in parallel to the axis of said light source. Means are provided for coupling the radiation from the light outlet window to a location at which the solid-state laser material is arranged.

In another aspect of the present invention, the light source has a larger diameter than that of the solid-state laser material, and an aperture type of light source is employed in which the circumference of the light source is surrounded by a diffusing reflector surface having an extremely high reflectivity. In one part of the circumference of the light source are provided one or more elongated transparent light outlet windows, each having a width of the same order as the diameter of the solid-state laser material.

In a further aspect of the present invention the optical pumping device employs a sufficiently thick light source with respect to the diameter of the elongated solid-state laser material, and a severed light outlet window type of aperture light source is employed in which a plurality of thin transparent light outlet windows, each having a width of the same order as the diameter of the solid-state laser material, are provided in the surface portions of said light source. Other portions of the light source surface are covered by a diffusing reflector surface having an extremely high reflectivity, so that a light of high brightness is emitted only in a number of particular directions, and the images of the light outlet windows are focused onto the elongated solid-state laser material by means of a plurality of imaging reflectors, whereby an intense optical pumping may be realized.

In yet another aspect of the present invention, the images of the plurality of light outlet windows of the light source (which is referred to as a severed light outlet window type of aperture light source) are appropriately grouped and focused onto a plurality of elongated solid-state laser materials by means of a plurality of imaging-type reflectors, whereby the solid-state laser materials are simultaneously, strongly and optically excited.

The optical pumping device for a solid-state laser, according to the present invention, utilizes the output of the light source without waste to enable a reduction of electric power consumption, and also by enabling simultaneous excitation of a plurality of solid-state laser materials, the optical pumping efficiency may be further enhanced.

To the accomplishment of the above and to such further objects as may hereinafter appear, the present invention relates to an optical pumping device for a laser, substantially as defined in the appended claims and as described in the following specification taken together with the accompanying drawings in which:

FIG. 1b is a cross-sectional view of the aperture type of light source illustrated in FIG. 1a;

Figure 1A:
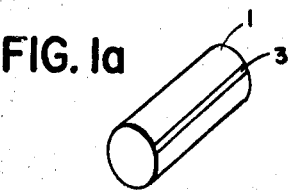
FIG. 1a is a perspective view of an aperture type of light source.
Figure 1B:
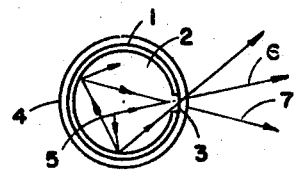

Referring first to FIGS. 1a and 1b, there is shown an aperture type of light source in which a diffusing reflector surface 1 completely surrounds the circumference of a luminous section 2 of the light source. Surface 1 is provided with a transparent light outlet window 3 in one part thereof and may be formed by coating, for example, magnesium oxide onto the inner periphery of a transparent glass tube. As a result of this design of the reflecting surface, of the light emitted from, for example point 5 (FIG. 1b) of section 2, one portion is directly emitted through light outlet window 3 as indicated by the path of a light ray 6, whereas most of the light from the luminous section is emitted through light outlet window 3 after being subjected to a number of diffusing reflections at the inner surface of diffusing reflector surface 1, as indicated by the path of a light ray 7. If the diffusing reflector surface could be made as an approximately perfect diffusing reflector surface and its reflectivity made approximately equal to 100 percent, substantially all of the light emitted from the luminous section 2 of the light source is emitted through light outlet window 3 so that the brightness of that light source becomes very high when viewed in the direction normal to light outlet window 3. A light source provided with such a diffusing reflector surface is commonly referred to as an aperture type of light source, and has been heretofore employed in a fluorescent lamp for lighting use.

If the laser-exciting light source is replaced by an aperture type of light source of the type just described, then with respect to the coupling of radiation, it is equivalent to the realization of a thin light source having its luminous section equal in size to the light outlet window, so that the coupling of radiation is facilitated and the optical output is intense in brightness because all the light generated by the entire luminous section of the light source is derived as a whole. Accordingly, a source of this type may be considered as an effective pumping light source for a laser.

However, the aperture of light source provided with only one light outlet window, as illustrated in FIG. 1, has a disadvantage as a result of the fact that the reflectivity of the diffusing reflector surface cannot be made practically equal to 100 percent. More particularly, if the light output window of that light source is very narrow in comparison to the surface area of the diffusing selector surface, the number of reflections of the light emitted from the light source between the diffusing reflector surface portions before it is emitted from the light outlet window is increased, and as an accumulative result of the slight absorption losses at the diffusing reflector surface portions, the intensity of the light emitted from the light outlet window is reduced. While the width of the light outlet window is narrowed for the purpose of facilitating the condensation of light, if the light absorption loss at the diffusing reflector surface portion is taken into account, it is then preferable to broaden the width of the light outlet window even by a small amount in order to reduce the number of reflections.

According to the present invention, this conflict in design goals is resolved by employing a specially designed, severed light outlet window type of aperture light source. The characteristic feature of the structure of the severed light outlet window type of aperture light source exists in that a plurality of elongated light outlet windows, each of which is similar to the light outlet window 3 of the light source indicated in FIG. 1, are provided along the circumference of the luminous section at appropriate intervals, and more particularly, the plurality of elongated light outlet windows are disposed so as to be parallel to each other, the sum of the surface areas of the light outlet windows is increased, and the number of reflections within the diffusing reflector surface for an emitting light ray is reduced, to thereby enhance the optical output.

A practical structure of the aperture type of light source having a plurality of light outlet windows may be realized by a relatively minor modification of the light source illustrated in FIG. 1. Therefore, further explanation and drawings relating to an aperture type of light source having a plurality of light outlet windows are omitted herein for the sake of simplicity.

Embodiments of an optical pumping device for a laser employing an aperture type of light source having a plurality of light outlet windows are now described with reference to several embodiments thereof.

Figure 2:
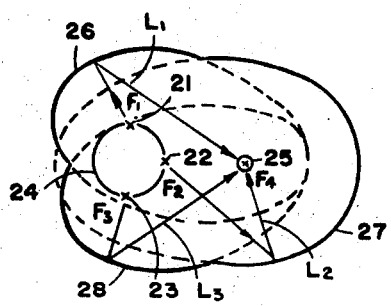
FIG. 2 is a transverse cross-sectional view of a first embodiment of the present invention.

Referring now to the embodiment of the invention illustrated in FIG. 2, a severed light outlet window type of aperture light source 24 has three axially extending, elongated light outlet windows 21, 22 and 23 formed therein. Outlet windows 21, 22 and 23 are only illustrated functionally for the sake of simplicity. Three elliptical cylindrical reflectors 26, 27 and 28 are all aligned in parallel to the longitudinal axis of the elongated solid-state laser material 25. The three elliptical cylindrical reflectors each have two focal points, one focal point of each reflector being defined at the central longitudinal axis of the solid-state laser material 25, while the other focal point of each reflector being defined respectively at one of the three light outlet windows 21, 22 and 23 of the severed light outlet window type of aperture light source. In other words, $F_4$ is a common focal point for the three reflectors 26, 27 and 28, while the other focal point $F_1$ of reflector 26 corresponds to the light outlet window 21 of the aperture light source, the other focal point $F_2$ of reflector 27 corresponds to light outlet window 22 of the aperture light source, and the other focal point $F_3$ of reflector 28 corresponds to the light outlet window 23 of the aperture light source.

When an optical pumping device for a solid-state laser is constructed in the above-mentioned manner, light emitted from a light source involving an extremely large volume of luminescent section is effectively emitted through any one of the light outlet windows with little absorption loss. Thus, each of the light rays $L_1$, $L_2$ and $L_3$ emitted through the elongated light outlet windows has a very high brightness, and also since a high coupling efficiency of radiation with the reflectors can be achieved, a highly efficient optical pumping device for a solid-state laser can be realized.

The number of the light outlet windows provided in the severed light outlet type of aperture light source need not be limited to three as in the embodiment illustrated in FIG. 2, but may be either increased or decreased, if desired. It will be understood that in such a case, the number of the corresponding reflectors must be increased or decreased in a similar manner.

In the first embodiment of FIG. 2, only elliptical cylindrical reflectors are utilized for focusing the light rays emitted from each light outlet window of the light source onto the elongated laser material. In the embodiment shown in FIG. 3, a convex lens may be employed and disposed between the light source and the laser material.

Figure 3:
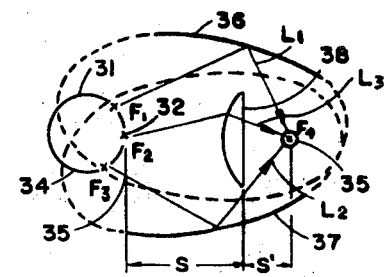
FIG. 3 is a transverse cross-sectional view of a second embodiment of the present invention.

Referring to FIG. 3, the optical pumping device for a laser comprises two elliptical cylindrical section reflectors 36 and 37, a light source 34 including three light outlet windows 31, 32 and 33, a solid-state laser material 35, and a convex lens 38 interposed between light source 34 and laser material 35. The section reflectors 36 and 37 are placed in such positions that they have one focal point $F_4$ in common, and have their other focal points at the positions $F_1$ and $F_3$ of the two light outlet windows 31 and 33, respectively. In addition, lens 38 having a focal length $f$ is disposed at a position such that its optical axis on a cross section is aligned with the linear segment between points $F_2$ and $F_4$, and that relation between the distance S from the point $F_2$ to lens 38 and the distance S' from lens 38 to the point $F_4$, satisfies the well-known lens equation $1/S+1/S'=1/f$. According to this arrangement, the light rays $L_1$ and $L_2$, respectively emitted from light outlet windows 31 and 33, are respectively reflected by the elliptic reflecting sections 36 and 37 onto the laser material 35 at point $F_4$, while the light ray $L_3$ emitted from light outlet window 32 is passed through lens 38, and thus condensed onto laser material 35.

It will thus be appreciated that the light emitted from the luminous section of the light source is efficiently condensed onto the solid laser material in this second embodiment.

In the embodiments of FIGS. 2 and 3, optical pumping devices for exciting only one solid laser material have been described. However, in the event that the diameter of the solid-state laser material is thin, inasmuch as it is deduced that the pumping energy required for producing laser oscillation is also small with respect to the ratio of the cross section areas therebetween, the power output of the light source has an ample surplus depending upon the kinds of solid-state laser materials to be used. In this event, it is thus possible to excite a plurality of solid-state laser materials by the use of only a single light source.

Figure 4:
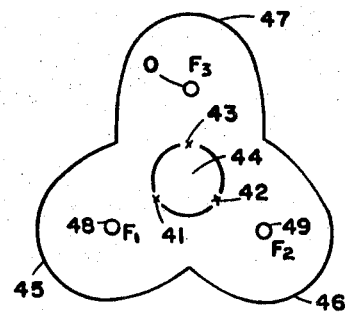
FIG. 4 is a transverse cross-sectional view of a third embodiment of the present invention.

Referring to the embodiment of the invention illustrated in FIG. 4, three solid-state laser materials are excited by only one light source. The laser materials 40, 48 and 49 are arranged in parallel to the longitudinal direction of a severed light outlet window type of aperture light source 44 having three elongated light outlet windows 41, 42 and 43, as are three elliptical cylindrical section reflectors 45, 46 and 47. Each of the three elliptical cylindrical reflectors has two focal points, and with regard to the respective elliptical cylindrical reflectors, one focal point is adapted to coincide with the position where the corresponding one of the solid-state laser materials 40, 48 and 49 is placed, while the other focal point is adapted to coincide with the position of the corresponding one of the three light outlet windows 41, 42 and 43 of the severed light outlet window type of aperture light source.

When a solid-state laser exciting device is constructed in the above-mentioned manner, a light ray emitted from a light source involving an extremely large volume of luminous section is effectively emitted through any one of the elongated light outlet windows 41, 42 and 43 with little absorption loss within the diffusing reflector surface, so that the light emitted through the elongated light outlet window has a very high brightness. Moreover, since the condensation of the light can be effectively achieved by means of the elliptical cylindrical reflectors and by making use of the thinness of the light outlet windows, an optical pumping device for a laser which can simultaneously operate a plurality of solid-state lasers with high efficiency, can be realized.

The number of the elongated laser materials need not be limited to three as is shown in the embodiment illustrated in FIG. 4, but instead may be selected at an appropriate number under the comparison between the requirement of the system and the capability of the light source. It will be appreciated that the number of the corresponding reflectors and the light outlet windows must be also increased or decreased, depending upon the number of the solid-state laser materials that are to be operated by the single light source.

Figure 5:
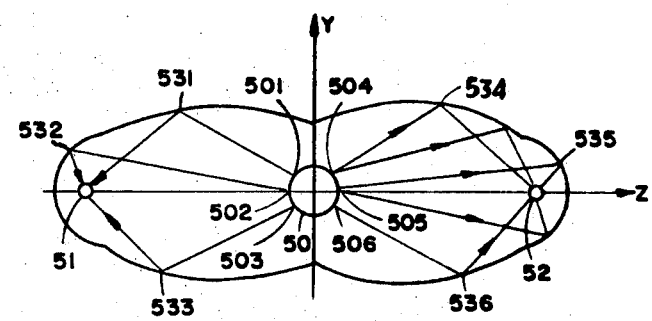
FIG. 5 is a transverse cross-sectional view of a fourth embodiment of the present invention.

Referring now to another embodiment of the invention as illustrated in FIG. 5, two elongated solid-state laser materials 51 and 52 and six elliptical cylindrical reflectors 531–536 are all arranged in parallel to the longitudinal direction of a severed light outlet window type of aperture light source 50 having six elongated light windows 501–506. The light outlet windows of light source 50 and the reflectors are divided into groups, each consisting of three such elements. Each of the six elliptical cylindrical reflectors 531–536 has two focal points, one of which is adapted to coincide with either one of the positions at which the two solid-state laser materials 51 and 52 are placed. The other focal point of each of the reflectors is adapted to respectively coincide with any one of the positions of the six light outlet windows of light source 50. More particularly, among the six light outlet windows of the severed light outlet window type of aperture light source 50, the light rays emitted from light windows 501, 502 and 503 are focused onto the elongated solid-state laser material 51 respectively by means of elliptical reflectors 531, 532 and 533, while the light rays emitted from the other three light windows 504, 505 and 506 are focused onto the other elongated solid-state laser material 52.

When an optical pumping device for a solid-state laser is constructed in the above-mentioned manner, light emitted from a light source involving an extremely large volume of luminous section is effectively emitted through any one of the elongated light outlet windows 501–506 with little absorption loss at the diffusing reflector surface, so that the light emitted through the elongated light outlet window has a very high brightness. Moreover, since the light outlet windows are as narrow as the diameter of the elongated solid-state laser materials, the light can be condensed efficiently by means of the elliptical cylindrical reflectors.

Therefore, an optical pumping device for a solid-state laser which can simultaneously operate a plurality of solid-state lasers at high efficiencies can be realized. The construction of the present embodiment is particularly effective in the event that the output of the light source does not have a surplus so that if only one light outlet window is allotted to one solid-state laser material, the optical excitation would become insufficient.

Figure 6:
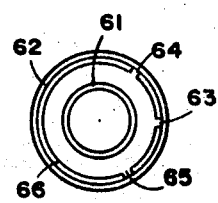
FIG. 6 is a transverse cross-sectional view of another aperture type of light source which may be used in the present invention.

Referring now to FIG. 6, there is shown an alternate design of the severed light outlet window of aperture light source in which a transparent cylindrical member 62 such as a glass tube surrounds a light source 61. A diffusing reflector surface 66 is mounted on the inner surface of cylindrical member 62, except at the location of light outlet windows 63, 64 and 65. It should be appreciated that the severed light outlet window type of aperture light source illustrated in FIG. 6 may be used in the embodiments of the present invention described hereinabove.

The diffusing reflector surface, which is utilized in the above-mentioned embodiments of the invention, may be formed as has been noted by coating magnesium oxide onto the inner surface of the glass tube of the light source or, alternatively, by coating zinc oxide instead of magnesium oxide, or by silver-plating.

The diffusing reflector surface need not be formed on the inner surface of the glass tube of the light source, but it is necessary that the reflector surface be arranged so that it surrounds the luminous section of the light source.

The present invention has been explained in connection with particular embodiments thereof, but the present invention should not be limited to the described embodiments, it being understood that the various modifications and changes can be made by those skilled in the art without departing from the spirit and scope of the present invention.

What is claimed is:

1. An optical pumping device for a laser comprising an elongated light source, high-reflectivity reflecting means surrounding the circumference of said light source and having a light outlet window formed therein, said outlet window having a dimension corresponding to that of the laser material and being arranged in parallel to the axis of said light source, and means for focusing the light from said light outlet window to a predetermined location at which the laser material is located.

2. The optical pumping device of claim 1 in which said focusing means has a first focal point located at said light outlet window and a second focal point located at said predetermined location.

3. The optical pumping device of claim 1, in which there are a plurality of said light outlet windows in said reflecting means and a corresponding number of said focusing means, each of the latter respectively having a first focal point positioned at one of said outlet windows, and a second focal point located at said predetermined location.

4. The optical pumping device of claim 3, in which said outlet windows are in the form of elongated slits formed in said surrounding reflecting means.

5. The optical pumping device of claim 1, in which there are a plurality of said windows formed in said reflecting means, said focusing means comprising a plurality of elliptical reflectors, there being one less of said reflectors than said windows, and further comprising a lens interposed between one of said windows and said predetermined location.

6. The optical pumping device of claim 5, in which said plurality of elliptical reflectors each have a first focal point located in common at said predetermined location and a second focal point respectively located at said outlet windows except for said one of said windows.

7. The optical pumping device of claim 6, in which said lens has a focal length $f$ substantially satisfying the lens equation $1/S+1/S'=1/f$, where $S$ is the distance between said one of said windows and said lens, and $S'$ is the distance between said lens and said predetermined location.

8. The optical pumping device of claim 1, in which there are a plurality of said windows formed in said reflecting means, said focusing means comprising a corresponding number of elliptical reflectors each having a first focal point respectively located at each of said windows, and a second focal point located at a plurality of spaced locations, each of the latter defining one of said predetermined locations at which a laser is located.

9. The optical pumping device of claim 1, in which there are first and second groups of said windows formed in said reflecting means, said focusing means comprising corresponding first and second groups of elliptical reflectors, each of said reflectors in said first group of reflectors having a focal point located in common at a first predetermined location, and a second focal point respectively located at said windows in said first group of windows, each of said reflectors in said second group of reflectors having a first focal point located in common at a second predetermined location remote from said first predetermined location, and a second focal point respectively located at said windows in said second group of windows.

10. In combination with the optical pumping device of claim 1, an elongated solid-state laser located at said predetermined location and having a longitudinal axis parallel to that of said light source, said window being in the form of an elongated slit having a length corresponding to the length of said laser.

11. An optical pumping device for a laser comprising a cylindrical reflector member having a transverse cross section consisting of a combination of a plurality of ellipses each of which has a common focal point at which the laser material is located, the other focal point of said ellipse being disposed on a common circumference, a cylindrical light-severing member having a plurality of elongated slits, each of which respectively passes through the other of said focal points on said common circumference, said slits being arranged in parallel to the axis of said reflector member, said light-severing member having an internal reflecting surface, and an elongated light source disposed within said light-severing member.

12. An optical pumping device for a solid-state laser comprising: an elongated light source having a plurality of elongated light outlet windows for producing a wide light flux with enhanced brightness in a particular direction, a combination of a plurality of cylindrical lenses and focusing reflectors surrounding said light source, and at least one solid-state laser positioned so that the images of said light outlet windows are focused thereon.

13. An optical pumping device for a solid-state laser comprising: a cylindrical reflector member having a transverse cross section consisting of a combination of a plurality of ellipses arranged in a manner such that one focal point of each of said ellipses is positioned on a common circumference, each of said reflector members having a reflective surface on its inside surface, a cylindrical light-severing member having a plurality of elongated slits passing through the respective focal points on said common circumference of said reflector member and arranged in parallel to the axis of said reflector member, said light-severing member having a reflecting film on its inside surface, an elongated light source disposed within said light-severing member, and a plurality of solid-state laser materials passing through the other focal points of said ellipses and disposed in parallel to the axis of said reflector member.

* * * * *

UNITED STATES PATENT OFFICE
CERTIFICATE OF CORRECTION

Patent No. 3,634777          Dated January 11, 1972

Inventor(s) Teiji Uchida et al

It is certified that error appears in the above-identified patent and that said Letters Patent are hereby corrected as shown below:

On the cover sheet [72] the names of the inventors should read -- Teiji Uchida; Shogo Yoshikawa; Kunihiki Washio; and Ryuji Tatsumi --.

Signed and sealed this 12th day of December 1972.

(SEAL)
Attest:

EDWARD M. FLETCHER, JR.  
Attesting Officer

ROBERT GOTTSCHALK  
Commissioner of Patents